J. D. FERRY.
EXPOSURE INDICATOR.
APPLICATION FILED AUG. 15, 1918.
1,344,873.
Patented June 29, 1920.
2 SHEETS—SHEET 1.
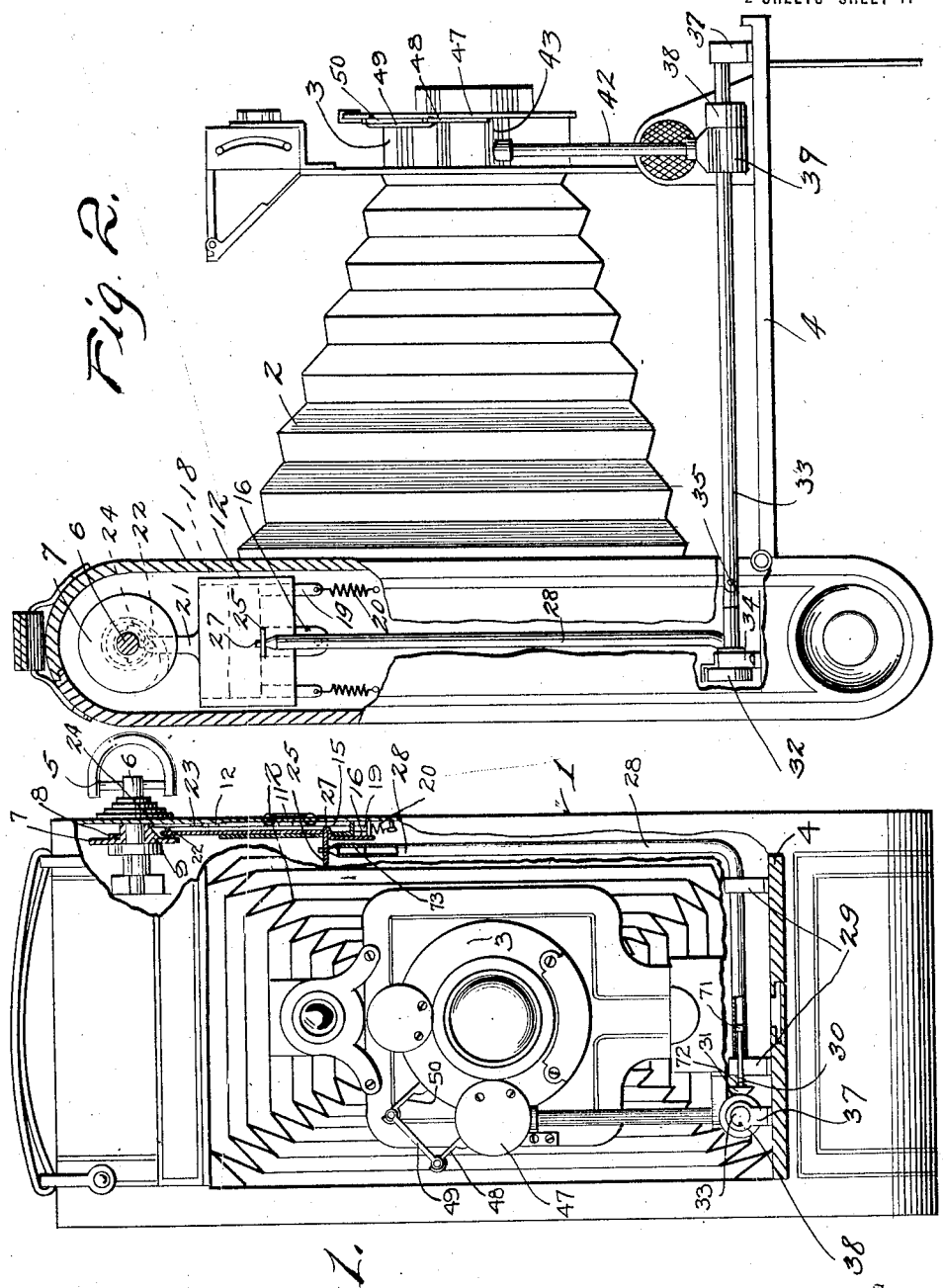
Inventor
Joe Dutra Ferry
Witness
Gle Walling
By C. A. Snow & Co.
Attorneys

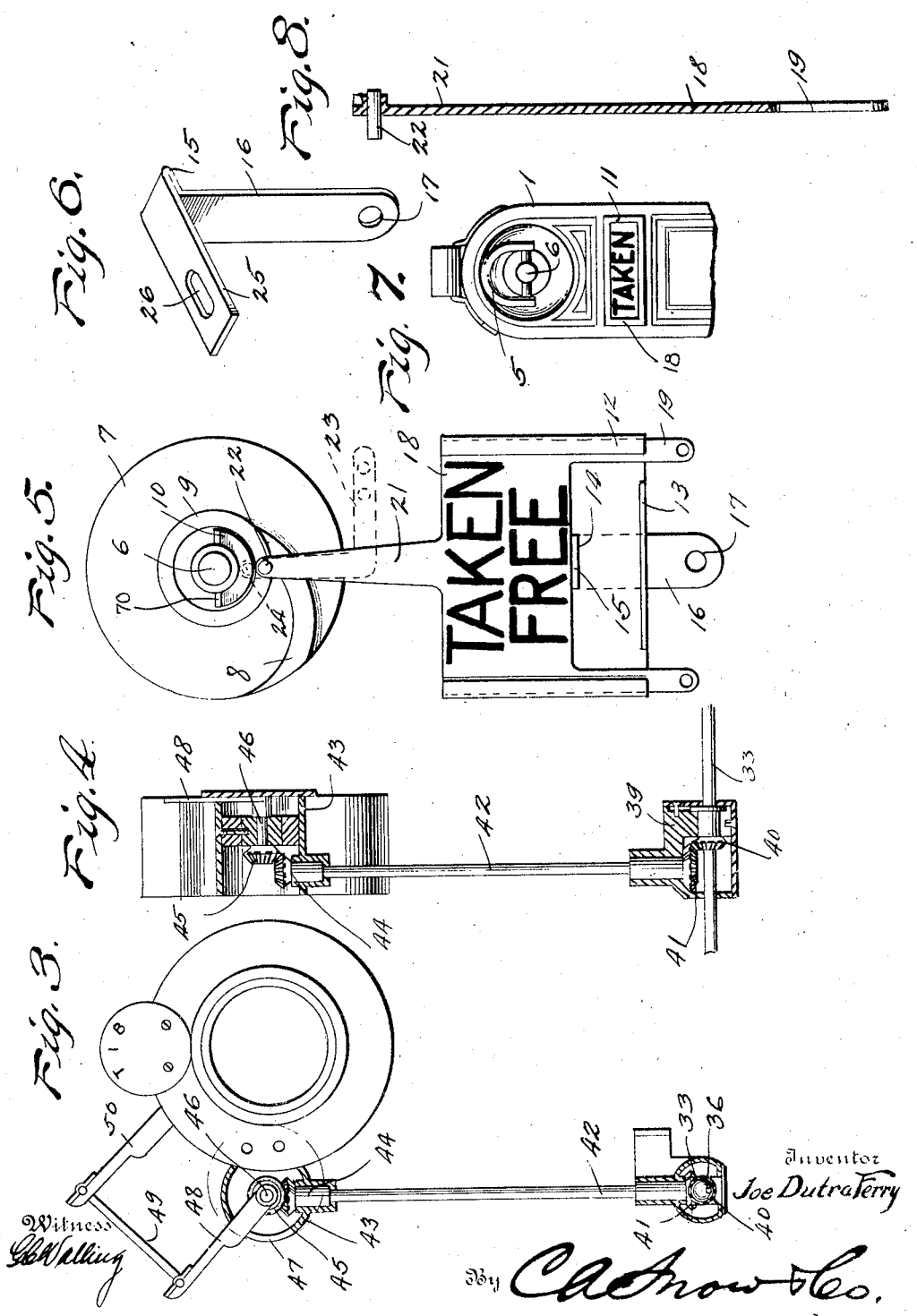

UNITED STATES PATENT OFFICE.

JOSEPH DUTRA FERRY, OF NILES, CALIFORNIA.

EXPOSURE-INDICATOR.

1,344,873. Specification of Letters Patent. Patented June 29, 1920.

Application filed August 15, 1918. Serial No. 250,053.

*To all whom it may concern:*

Be it known that I, JOSEPH DUTRA FERRY, a citizen of the United States, residing at Niles, in the county of Alameda and State of California, have invented a new and useful Exposure-Indicator, of which the following is a specification.

The subject of this invention is an exposure indicator for cameras.

The main object of the invention is to provide means for indicating when a film within the camera has been exposed.

Another object of the invention is the provision of a visible sign which is automatically actuated with the operation of the shutter of the camera.

Another object of the invention is the provision of means for resetting the sign.

The invention also contemplates improving the construction generally and enhancing the utility of exposure indicators.

With the foregoing and other objects in view, which will appear as the description proceeds, the invention resides in the combination and arrangement of parts and in the details of construction hereinafter described and claimed, it being understood that changes in the precise embodiment of the invention herein disclosed can be made without departing from the spirit of the invention.

The invention is illustrated in the accompanying drawings, wherein:—

Figure 1 is a view in front elevation, parts in section, of a camera constructed in accordance with the invention;

Fig. 2 is a view in side elevation, parts in section;

Fig. 3 is a detail view in front elevation, partly in section, of the shutter casing and operative parts connected thereto;

Fig. 4 is a view in side elevation, partly in section, of the same;

Fig. 5 is a detail view in elevation of the sign slide and the operative parts therefor;

Fig. 6 is a detail view in perspective of the slide retaining spring;

Fig. 7 is a fragmentary view in side elevation of the camera;

Fig. 8 is a detail view in vertical section of the slide.

Referring to the drawings by numerals of reference:—

In carrying out the invention the usual camera housing 1 is provided, the same being herein shown as the housing of a well-known hand camera, in which the folding focusing bellows 2 is adapted to be contained. The usual shutter casing 3 is secured to the forward end of the bellows 2, and the housing 1 is adapted to be closed by the usual door 4 which is suitably hinged thereto.

A handle 5 is provided on the outer end of a stub shaft 6, which is journaled in the housing 1, by which handle the stub shaft may be rotated for the purpose of winding the film into place to take a picture. Rigidly secured to the shaft 6, within the housing 1, is a disk 7, see Figs. 1, 2 and 5, upon one face of which is formed a curved rib 8, which extends from a position adjacent the center of the disk to the periphery thereof. The rib 8 merges, at its inner end, into a sloping or frusto-conical track 9 which is concentric with the shaft 6. Within the track 9 is formed a semi-circular cam track 10 which is positioned adjacent the juncture of the rib 8 with the track 9, and which has its ends 70 beveled or sloping, as indicated in Fig. 5.

The side of the housing 1 is provided with a sight opening or window 11, and secured to the inner face of the side wall of the housing, by brazing or otherwise, is a retaining and guide plate 12, which overlies the window. The sides of this plate 12 are bent back to form grooves, while a flange 13 is formed transversely of the lower edge of the plate to provide a retaining strip. The plate 12 is also provided with a slot 14, which is positioned just below the sight opening 11, and which is adapted to receive the tongue 15 of a resilient latch 16, which is apertured, as at 17, to receive a screw, rivet or other means for fastening the latch to the side of the housing 1.

Mounted to slide within the plate 12, and normally held in elevated position by the tongue 15 of the latch 16, is a sign plate 18, on which is displayed the words "Taken" and "Free," or words of similar import, the word free being in register with the sight opening when the sign is in its normal position. The sign plate 18 is formed with downwardly projecting arms 19 which are apertured to receive the ends of retractile springs 20, the other ends of which are secured by rivets or otherwise to the side of the housing, and which serve to exert a downward pull on the sign plate.

A tongue 21 rises from a central position on the upper edge of the sign plate 18, and the upper end of this tongue is provided with an aperture in which is slidably mounted a pin 22, which pin is adapted to be engaged by the rib 8, when the disk is revolved in winding the film, and to ride upon the rib to draw the sign plate 18 to its normal or elevated position. After the pin has ridden upon the rib to bring the sign plate to its elevated position, the pin comes in contact with the track 9, which causes the pin to slide outwardly through the aperture in the tongue 21. This forcing of the pin outwardly puts it in position to clear the rib 8, or other projecting parts, when the plate 18 is released by the latch 16, so that the plate may be brought to its lower position under the tension of the springs 20, and thus display the word "Taken."

That the pin 22 may be normally forced inwardly toward the disk 7, an angularly formed flat spring 23 is provided, which is riveted or otherwise secured to the inner face of the side of the housing 1, and which overlies and presses against the outer face of the tongue 21, and the outer end of the pin 22. The upper free end of the spring 23 is formed with a boss 24, which is positioned within the space between the track 9 and the shaft 6, and which, during each half revolution of the shaft, rides on the cam track 10. When riding on the cam track 10 the pressure of the spring 23 is released from the pin 22, and the spring will, consequently, not force the pin inwardly to engage the rib 8 during the descent of the sign plate.

For the purpose of actuating the latch 16 to release the sign plate 18 when an exposure has been made, the latch is formed with an angularly disposed portion 25 in which is provided a slot 26 for the reception of the conical shaped tip 27 of a plunger 73. The plunger 73 is reciprocable in the upper end of a tube 28, which extends vertically beside the side of the housing 1, and which is bent at the lower end of the housing to extend transversely of the housing, brackets 29 being provided in the bottom of the housing for its support. The tube 28 terminates adjacent the opposite side of the housing and in this end is provided a piston 71, furnished with a piston rod 30, the extending end of which is provided with a button 31.

A cam 32 coöperates with the button 31 and is rockable to reciprocate the piston and, through the air pressure in the tube, reciprocate the plunger 27 to move the latch 16 and draw the tongue 15 out of the slot 14 and release the sign plate 18. The piston may be returned to normal position by means of a spring 72. The cam 32 is rigidly mounted on the rear end of a shaft 33, which is supported at that end in a bracket 34 secured in the housing 1. The shaft 33 is hinged as at 35 so that the same may be folded with the door of the housing, along which it extends and to which it is secured, and the shaft is formed with a longitudinal keyway or slot 36 (see Fig. 3).

The forward end of the shaft 33 is supported for rotation and for longitudinal sliding movement in a bracket 37, which is secured to the door 4, and a stop collar 38 is secured on the shaft 33 adjacent this end. Slidable on the shaft 33 is a housing 39 which is limited in its forward movement on the shaft by the collar 38, and within this housing is a pinion 40 which is keyed to the shaft 33 and slidable longitudinally thereof. The pinion 40 meshes with a pinion 41 which is within the housing and is rigid on the lower end of a vertically disposed shaft 42. The upper end of the shaft 42 is journaled in a housing 43 which is secured to the shutter casing 3 by rivets or otherwise, and upon this end of the shaft is rigidly secured a pinion 44. The pinion 44 meshes with a pinion 45 which is rigid on a stub shaft 46, journaled in the casing 43.

A slot 47 is provided in the casing 43 and through this slot projects a crank arm 48, which is rigidly secured to and extends radially from the stub shaft 46. A link 49 connects the crank arm 48 with the lever 50 by which the shutter of the camera is operated. Thus when the lever 50 is rocked to actuate the shutter, the stub shaft 46 is also rocked, and, through it and the pinions 44 and 45, the shafts 42 and 33 are rocked, thereby actuating the plunger 27 and releasing the sign plate.

When the camera is to be folded up, the housing 39 with the gearing therein, will slide along the shaft 33 as the bellows 2 is folded into the housing 1, and the door 4 may then be closed, the shaft 33 folding the hinge 35.

Having thus described the invention, what is claimed as new and sought by Letters Patent, is:—

1. A camera comprising a housing; a shaft journaled in the housing; a disk on the shaft and provided with an inclined track, the disk having a curved rib merging into the track and being supplied with a cam track located within the inclined track; a sign slidable in the housing; a member slidable in the sign and coöperating with the rib to move the sign in one direction, said member coacting with the inclined track to retract said member, thereby to permit the sign to move in an opposite direction; spring means for moving the sign in the last specified direction; and a spring coöperating with said member to advance the same for coöperation with the rib, the spring coöperating with the cam track to relieve the action of the spring on said member when the sign moves responsive to the spring means.

2. A camera comprising a housing; a shaft journaled in the housing; a disk on the shaft and provided with an inclined track, the disk having a rib merging into the track; a sign slidable in the housing; a member slidable in the sign and coöperating with the rib to move the sign in one direction, said member coacting with the inclined track to retract said member, thereby to permit the sign to move in an opposite direction; and spring means for moving the sign in the last specified direction.

3. A camera comprising a housing; a sign slidable in the housing; spring means for moving the sign in one direction; a member movable in the sign; a spring coöperating with said member to advance the same; a shaft journaled in the housing; means carried by the shaft and coöperating with said member, when the same is advanced, to move the sign in an opposite direction; means carried by the shaft and coöperating with said member to retract said member against the action of the spring; and means carried by the shaft for relieving the action of the spring on said member while the sign is moving in the first specified direction.

4. The combination with a camera including a housing having a sight opening and a main opening, and a door for closing the main opening, of a sign plate supported in the housing adjacent the sight opening, means for normally holding the plate in elevated position, a jointed rock shaft supported within the housing and on the door, means for automatically rocking the shaft, means actuated by the rocking of the shaft for releasing the plate holding means to permit the plate to move from normal position to display a sign at the sight opening, and means for restoring the plate to normal elevated position.

5. The combination with a camera including a housing having a sight opening and a main opening, and a door hinged to the housing for closing the main opening, of a sign plate supported within the housing adjacent the sight opening, means for normally retaining the plate in elevated position, resilient means for drawing the plate to lowered position when released, supports secured within the housing and to the door respectively, a jointed rock shaft journaled in the supports, means for rocking the shaft, means actuated by the rocking of the shaft to release the plate retaining means, and means for restoring the plate to normal position.

6. The combination with a camera including a housing having a sight opening and a main opening, a door hinged to the housing for closing the main opening, and a shutter for the camera, of a sign plate supported in the housing adjacent the sight opening, means for normally retaining the plate in elevated position, resilient means for drawing the plate to lower position when released, supports secured in the housing and to the door respectively, a rock shaft journaled in the supports, means actuated by the operation of the shutter for rocking the shaft, means actuated by the rocking of the shaft to release the plate retaining means, and means for restoring the plate to normal elevated position.

7. The combination with a camera including a housing having a sight opening and a main opening, a door hinged to the housing for closing the main opening, and a shutter for the camera, of a sign plate supported within the housing, means for normally holding the plate in elevated position, supports secured within the housing and to the door, a rock shaft journaled in the supports, gearing connected to the rock shaft and slidable longitudinally thereof, said gearing operated by the operation of the shutter to rock the shaft, means actuated by the rocking of the shaft to release the plate retaining means, and means for restoring the plate to normal position.

In testimony that I claim the foregoing as my own, I have hereto affixed my signature in the presence of two witnesses.

JOE DUTRA FERRY.

Witnesses:
L. V. EASTERDAY,
EMILY RIBEIRO.